US011328307B2

United States Patent
Venkatraman et al.

(10) Patent No.: US 11,328,307 B2
(45) Date of Patent: May 10, 2022

(54) BRAND ABUSE MONITORING SYSTEM WITH INFRINGEMENT DETECTION ENGINE AND GRAPHICAL USER INTERFACE

(71) Applicant: OpSec Online, Ltd., Lancaster, PA (US)

(72) Inventors: Krishna Venkatraman, San Francisco, CA (US); Paul Garrett Gaudini, San Francisco, CA (US); Joshua Hopping, Boise, ID (US); Marcos Perreau Guimaraes, San Francisco, CA (US); Prasad Narasimha Akella, Palo Alto, CA (US)

(73) Assignee: OpSec Online, Ltd., Lancaster, PA (US)

( * ) Notice: Subject to any disclaimer, the term of this patent is extended or adjusted under 35 U.S.C. 154(b) by 936 days.

(21) Appl. No.: 15/052,595

(22) Filed: Feb. 24, 2016

(65) Prior Publication Data

US 2016/0253679 A1    Sep. 1, 2016

Related U.S. Application Data

(60) Provisional application No. 62/119,865, filed on Feb. 24, 2015.

(51) Int. Cl.
*G06Q 30/00* (2012.01)
*G06Q 50/18* (2012.01)

(52) U.S. Cl.
CPC ....... *G06Q 30/0185* (2013.01); *G06Q 50/184* (2013.01)

(58) Field of Classification Search
CPC .............. G06Q 30/0185; G06Q 30/0248
See application file for complete search history.

(56) References Cited

U.S. PATENT DOCUMENTS

2016/0055490 A1 * 2/2016 Keren ........... G06Q 30/00
705/14.47

OTHER PUBLICATIONS

Goodchild, Brand protection and abuse: Keeping your company image safe on social media, https://www.csoonline.com/article/2125689/brand-protection-and-abuse--keeping-your-company-image-safe-on-social-medi.html (Year: 2010).*

* cited by examiner

*Primary Examiner* — Aryan E Weisenfeld
(74) *Attorney, Agent, or Firm* — Oblon, McClelland, Maier & Neustadt, L.L.P.

(57) ABSTRACT

A computer-based system connected to a remote user device and a plurality of services. A data collection engine having an input adapted to receive a set of collection data from a set of services, the set of collection data comprising a set of brand data for comparison against a control set of data stored in a database and having a set of fields and via the digital communications network a query. An entity identification module identifies and extracts within the set of collection data a set of entity data, compares the set of entity data against a set of entity control data to resolve entity identification, associates an entity identifier with the identified entity, and determines a set of relationship data between entities; a matching module adapted to receive data derived from the set of collection data and compare the received data against a set of known brand data and generate a set of comparison data and an output indicating a presence of a match; a scoring module adapted to generate a set of score data based on the set of comparison data. A graphic user interface presents a graphic representation of the set of scored data on a display device.

25 Claims, 7 Drawing Sheets

BRAND ABUSE MONITORING SYSTEM WITH INFRINGEMENT DETECTION ENGINE AND GRAPHICAL USER INTERFACE

CROSS REFERENCE TO RELATED APPLICATION

The present application claims benefit of priority to U.S. Provisional Application 62/119,865, filed Feb. 24, 2015, entitled AUTOMATED IDENTIFICATION OF HIGH VALUE TARGETS FROM INCIDENTS OF ONLINE BRAND ABUSE, the contents of which are hereby incorporated by reference herein in the entirety.

FIELD OF THE INVENTION

The present invention relates generally to digital communications over a communications network and more specifically to providing services connection between service providers and an integration facility for delivering enhanced target and abuse identification services. The invention further relates to providing a graphical user interface for delivering enhanced target and abuse identification services through an integrated service provider.

BACKGROUND OF THE INVENTION

With the advents of computer-implemented data capturing and processing and mass data storage, the amount of information generated by mankind has risen dramatically and with an ever quickening pace. As a result there is a continuing and growing need to collect and store, identify, track, classify and to assimilate, transform and re-define this growing sea of information for heightened use by humans. As a result, there are many systems presently available that have classified, tagged and organized documents and other records and have linked attributes related to such documents with entities, e.g., patent databases that link patent documents with entities (assignee companies and inventors and patent attorneys and patent examiners) and with classification types (such as IPC classification codes). These systems fail to provide a system for identifying peer entities based on such linking.

In many areas and industries, including the financial and legal sectors and areas of technology, for example, there are content and enhanced experience providers, such as The Thomson Reuters Corporation. Such providers identify, collect, analyze and process key data for use in generating content for consumption by professionals and others involved in the respective industries. Providers in the various sectors and industries continually look for products and services to provide subscribers, clients and other customers and for ways to distinguish their firm's offerings over the competition. Such providers constantly strive to create and provide enhanced tools, including search tools, to enable clients to more efficiently and effectively process information and make informed decisions.

Search engines are used to retrieve information of interest in response to user defined queries or search terms. In many areas and industries, including professional services sector and media and brand interested groups, for example, there are content and enhanced experience providers, such as The Thomson Reuters Corporation. Such providers identify, collect, analyze and process key data for use in generating content, such as reports and articles, for consumption by professionals and others involved in the respective industries. In addition, many infringers and brand abusers promote sales of unauthorized goods, copyright violations, piracy, trademark infringement, fraud, and malware via the Internet. Accordingly, the goods and associated web pages and offers for sale are available for detection and identification and for use in supporting enforcement efforts. Many of these unauthorized activities have a measureable impact on the pricing and sale of authorized goods. Professionals and providers in the various sectors and industries continue to look for ways to enhance detection and monitoring of unauthorized sales of competing goods. Such providers strive to create and provide enhanced tools, including search and visualization tools, to enable clients to more efficiently and effectively process information and make informed decisions.

Advances in technology, including web crawling, database mining and management, search engines, linguistic recognition and modeling, provide increasingly sophisticated approaches to searching and processing vast amounts of data and documents, e.g., database of news articles, financial reports, blogs, SEC and other required corporate disclosures, legal decisions, statutes, laws, and regulations, that may affect business performance, including pricing and availability of commodities. Information technology and in particular information extraction (IE) are areas experiencing significant growth to assist interested parties to harness the vast amounts of information accessible via the Internet.

The following references provide background to the field of endeavor of the inventors: Binary codes capable of correcting deletions, insertions, and reversals. V I Levenshtein—Soviet physics doklady, 1966; A new approach to text searching, R Baeza-Yates. G H Gonnet—Communications of the ACM, 1992; Efficient string matching: an aid to bibliographic search. A V Aho, M J Corasick—Communications of the ACM, 1975; Support-vector networks. Cortes, C.; Vapnik, V. (1995). Machine Learning 20 (3): 273; Random forests. L Breiman—Machine learning, 2001—Springer; Latent dirichlet allocation. D M Blei, A Y Ng, M I Jordan—the Journal of machine Learning research, 2003; Hierarchical Dirichlet Processes. Yee Whye Teh, Michael I Jordan, Matthew J Beal & David M Blei (2006), Journal of the American Statistical Association, 101:476, 1566-1581 and are hereby incorporated be reference in their entirety.

There are known services providing preprocessing of data, entity extraction, entity linking, indexing of data, and for indexing ontologies that may be used in processing by the further improvement of the present invention. For example U.S. Pat. No. 7,333,966, entitled "SYSTEMS, METHODS, AND SOFTWARE FOR HYPERLINKING NAMES", U.S. Pat. Pub. 2009/0198678, entitled "SYSTEMS, METHODS, AND SOFTWARE FOR ENTITY RELATIONSHIP RESOLUTION", U.S. patent application Ser. No. 12/553,013, entitled "SYSTEMS, METHODS, AND SOFTWARE FOR QUESTION-BASED SENTIMENT ANALYSIS AND SUMMARIZATION", U.S. Pat. Pub. 2009/0327115, entitled "FINANCIAL EVENT AND RELATIONSHIP EXTRACTION", and U.S. Pat. Pub. 2009/0222395, entitled "ENTITY, EVENT, AND RELATIONSHIP EXTRACTION", the contents of each of which are incorporated herein by reference herein in their entirety, describe systems, methods and software for the preprocessing of data, entity extraction, entity linking, indexing of data, and for indexing ontologies in addition to linguistic and other techniques for mining or extracting information from documents and sources. Incorporated by reference is U.S. Pat. Publ. 2011/0191310 (Liao et al.) entitled METHOD

AND SYSTEM FOR RANKING INTELLECTUAL PROPERTY DOCUMENTS USING CLAIM ANALYSIS.

Brand owners require deep insight into the ever changing brand behavior of products and services to create long-term competitive advantage. Companies who develop a responsive learning strategy based on Internet behavior will succeed provided they have the richest dataset of brand, fraud, and piracy related abuse and market intelligence information. What is needed is a system that will make it easy for customers to detect unauthorized use of trademarks, brand names, images, brand logos and other proprietary properties and discover relationships, patterns, and trends. What is needed is a system that will provide: comprehensive brand abuse intelligence across threat vectors; identification of bad actors across many possible online identities; more effective take down of bad actors and brand abuse; potential new revenue sources from market intelligence of under-served markets What is needed is a digital communications system for receiving and integrating multiple service communication feeds into an overall composite deliverable by way of an enhanced and interactive user interface.

SUMMARY OF THE INVENTION

In one manner the invention relates to a Brand Abuse and Monitoring System ("BAMS") and related Infringement Detection Engine ("IDE"), for detecting potential abuses of brand names, infringement of goods, identification of entities involved in such activities, and a system for maintaining records and database records. In one exemplary manner of operation a user operating a user interface on a remote user device enters a query related to a brand or trademark or logo of interest. The query is communicated over a communications network to a digital communications interface ("DIC") associated with the IDE. The IDE processes the query and associates an entity identifier to the entity of interest and via the DIC issues a search request to a plurality of services adapted to render potential infringements and infringer identification information, such as lists of activities and potential infringers and related similarity scores. The IDE aggregates into dimensions the list(s) and similarity scoring information as delivered or exposed by the underlying services. The search and identified entities may be companies in one domain but the invention is broadly applicable to any entity types. The present invention comprises user interface aggregation and clustering engines that are domain independent, and other embodiments of the present invention may provide similar services for other domains.

The present invention separates or distinguishes between different dimensions (which may include facets or attributes) and representative service signals to effectively score and cluster entities based on attributes of interest (e.g., analyst coverage, trademark holdings or descriptions, legal classifications, industry classifications, etc.) The invention may also cluster lists of similar entities and aggregate sets of scores related to similar entities into a readily comparable composite scores. The invention provides a user interface that may be divided into and displayed as a set of layers (e.g., clustering, dimension aggregation, and GUI). The present invention may provide for multiple possible views of the ranked lists based on specific use cases. A variety of dimension services are available, such as those described above, that enable the present invention to be useful and accurate in various domains (e.g., comparing companies, individuals, products, commodities, and comparing academic institutions).

A first embodiment of the present invention provides a computer-based system connected via a communications network to a remote user device and a plurality of services, the system comprising: a data collection engine comprising: an input adapted to receive a set of collection data from a set of services, the set of collection data comprising a set of brand data for comparison against a control set of data stored in a database and having a set of fields and via the digital communications network a query; an entity identification module adapted to identify and extract within the set of collection data a set of entity data, compare the set of entity data against a set of entity control data to resolve entity identification, associate an entity identifier with the identified entity, and determine a set of relationship data between entities; a matching module adapted to receive data derived from the set of collection data and compare the received data against a set of known brand data and generate a set of comparison data and an output indicating a presence of a match; a scoring module adapted to generate a set of score data based on the set of comparison data; and a graphic user interface adapted to present a graphic representation of the set of scored data on a display device associated with the remote user device.

The invention of the first embodiment may be further characterized by one or more of the following: a search module adapted to rank by a first relevance metric directed to a brand protection criteria; a smart group-by means for allowing bulk action based on a brand protection criteria; a classification module adapted to classify entities by brand abuse category; a classification module adapted to transform text data extracted from the set of document data into numeric vectors; means for performing a text to vector transformation using Latent Dirichlet Allocation (LDA); a classification module adapted to use the Random Forest (RF) algorithm or other suitable stochastic classification algorithm; a graph layer adapted to identify relationships between entities into a directed property graph, wherein entities (vertices) and relations (edges) of the graph are multi-valued; an attribute matching module; the data collection engine includes uses a cluster operating on a set of connected computers to obtain brand protection information by one or more of crawling web pages over the Internet, harvesting search engines, crawling online market places, collecting social media feeds, detecting potential phish emails and landing pages, collecting mobile application data; the data collection engine includes collecting detection data sets representing a unit data point or record comprising a set of fields and values and storing the detection data sets; the detection data sets comprises one or more of the following fields: text such as product name or brand; numbers such as price or brand or product identifiers; images such as logos or trademarks or photographs; video media; structured data such as a HTML page or source code; the data collection engine stores the detection datasets in a relational database or a NoSQL database distributed in a cluster of computers connected over a network; the entity identification module establishes an entity resolution layer and includes natural language processing, machine learning and image matching techniques to identify fields and patterns in collected data and categorize them using an ontology of entities relevant to brand protection; the entity resolution layer is configured based on a defined type or kind of entity and data source; the entity resolution layer parses entities from unstructured text using one or more of text pattern matching techniques, efficient algorithms for fuzzy text pattern matching, Baeza-Yates-Gonnet algorithm for single strings, and fuzzy Aho-Corasick algorithm for multiple string matching; the entity identification module includes using supervised or unsupervised document classification techniques after transforming collected text documents into numeric vectors using one or more of: multiple string fuzzy text pattern matching algorithms; fuzzy Aho-Corasick algorithm; topic models; Latent Dirichlet Allocation (LDA); and Hierarchical Dirichlet Processes (HDP); the entity identification module determines a set of relationship data between entities based on collected detection data sets by categorizing detection into one from the set consisting of: ecommerce websites; marketplace listings; social media posts; and paid search advertisements, and categorizing the detection fields into one of the kinds of entities consisting of: "Key" entities which uniquely define a detection; "Node" entities which correspond to fields that have the potential to create relations between detections; and "Property" entities which correspond to fields that are not expected to create meaningful relations between detections, such as a price; a graph layer adapted to identify relationships between entities into a directed property graph, wherein entities are vertices and relations are edges of the graph and are multi-valued; the graph layer comprises a vertex defined by a unique identifying number and a label, and wherein the set of vertex identity numbers of the vertices has an outgoing edge; a graph is represented in a map structure where the vertex identity numbers are the keys and the list of other properties are the values; the map structure is distributed in a cluster of computers using a distributed hashing technique; a cluster of computers connected over a network, the cluster adapted to load a brand dataset into a graph database and append a set of detection vertices to a graph vertex containing the value of a key node field appended to the graph; property entity fields are appended as key/value pairs into a vertex created for the key entity of a current detection and wherein edges from the node vertices to the key vertices are appended to the graph; collected data comprise images and further comprising an image matching and clustering module adapted to cluster images by determining a distance metric between a first image and a second image, the distance being determined by taking the mean squared pairwise difference of features extracted from each of the first image and the second image; a hierarchical clustering algorithm adapted to cluster images in the leaves of a prefix tree, wherein each node is represented by the average of a set of feature vectors of all images in children branches; a new collected image is matched to an existing image cluster by computing the distance of the new image to nodes starting by the root of the cluster and going toward the child with the smallest distance; within the prefix tree structure images are represented by an efficient Locality Sensitive Hashing technique, wherein each child of a node is labeled by a unique letter from a vocabulary of symbols and each leaf of the prefix tree is represented by a unique string of symbols; an index search module adapted to search on a graph without having to traverse the whole graph and wherein querying the graph is performed by: 1) use the indexes to efficiently retrieve the vertex identifier of a select vertex containing an entity of interest; and 2) traverse the graph starting from the select vertex using a breath-first traversal algorithm; a graph augmentation module adapted to perform one or more of: 1) continuously and automatically correlate existing entities in the graph with external sources of information, wherein upon an entity determined to be correlated with an external document a background task: resolves entities in the document and appends to the graph new entities found in the document, and edges between the document entities and the graph entity are appended to the graph; 2) present a user with an interface to initiate an on-demand correlation between an entity and an external source; and 3) present a user with an interface to manually edit, append or delete entities and edges of the graph.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

DETAILED DESCRIPTION OF THE INVENTION

The present invention will now be described in more detail with reference to exemplary embodiments as shown in the accompanying drawings. While the present invention is described herein with reference to the exemplary embodiments, and particularly with reference to peer detection services, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

Figure 1:
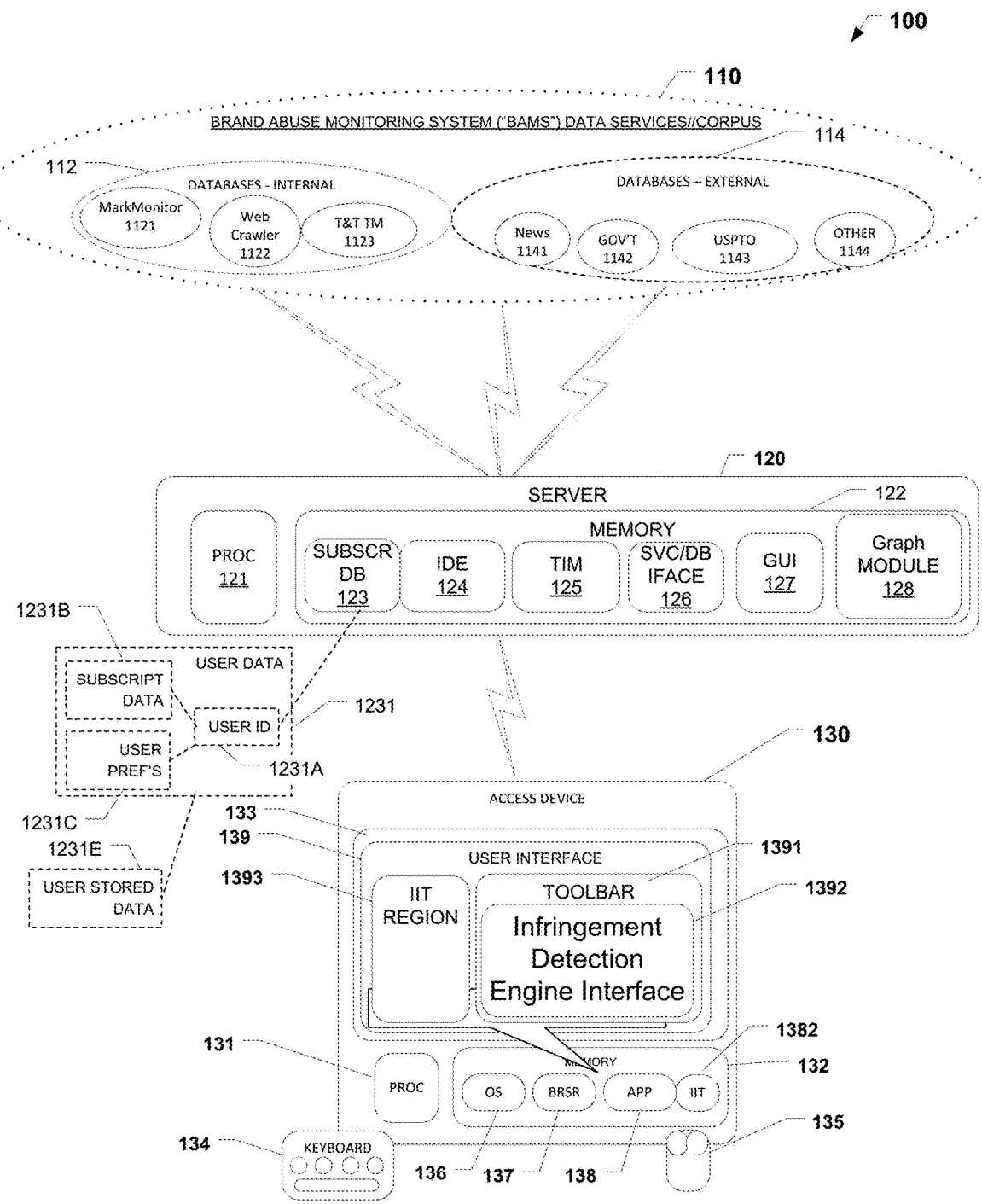
FIG. 1 is a schematic diagram illustrating an exemplary computer-based system for implementing the present invention Brand Abuse Monitoring System (BAMS)
Figure 2:
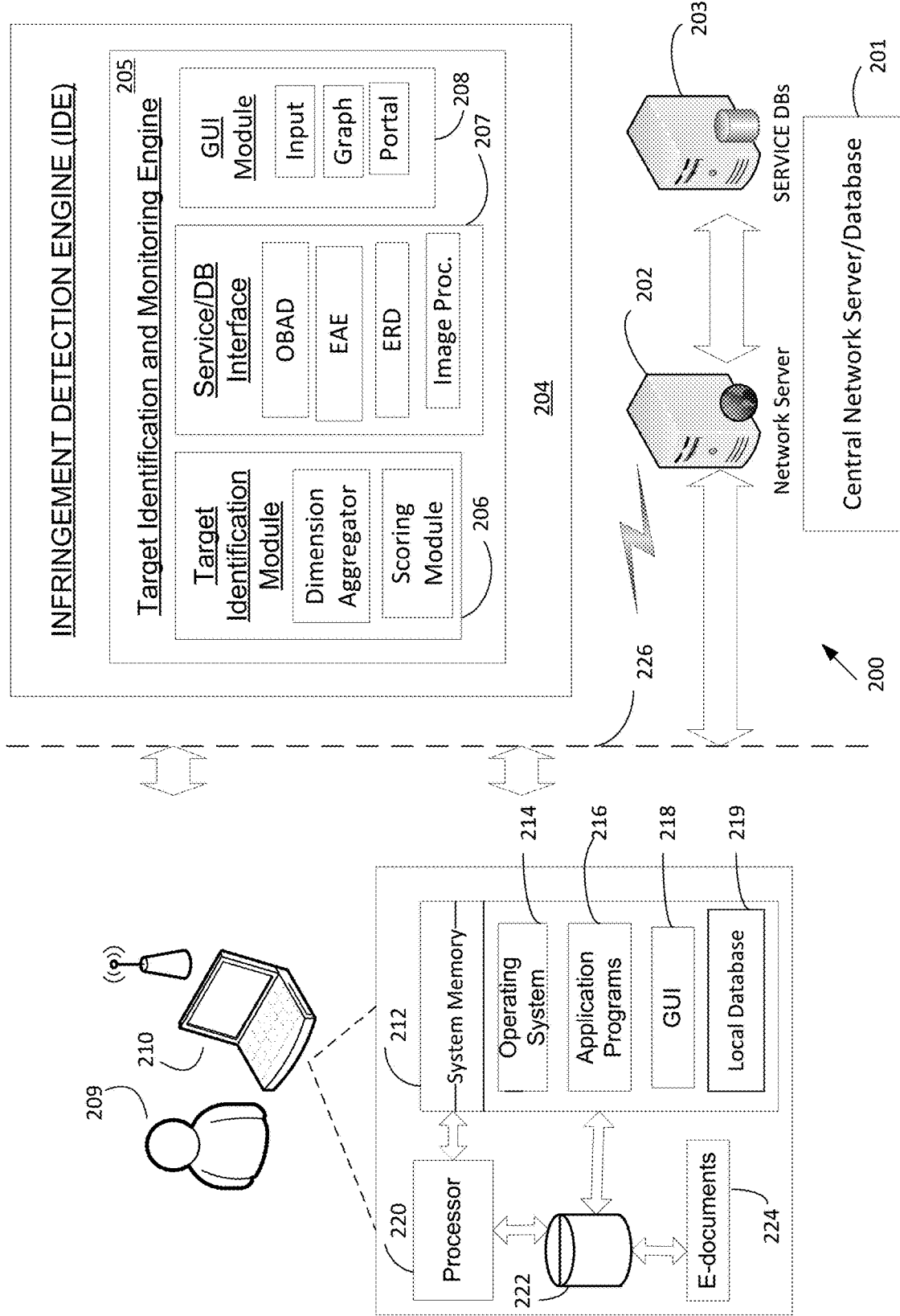
FIG. 2 is a schematic diagram illustrating an exemplary computer-based system for implementing the present invention BAMS system.

The present invention provides a system and engine to generate an Infringer Graph with Brand Abuse Activity Between Suspicious Users of the Internet. An infringer graph is built which includes brand abuse activity, shared identities, and connections between suspicious users of the Internet and can be used to improve infringement target identification and brand abuse remediation. Brand abuse activity and target data will affect infringing suspect identification, clustering and pattern matching used in investigations of brand abuse on the Internet. This brand abuse activity includes selling fake products or services, sharing/distributing pirated content, violating partner agreements, participating in grey market selling, or any misuse of trademarks, patents, or copyrights linked with the Internet FIGS. 1 and 2 illustrate exemplary embodiments of the overall architecture of the present invention. FIG. 1 is a schematic diagram of a client/server/database architecture associated with one implementation of the BAMS of the present invention. With reference to FIG. 1, the present invention provides a BAMS 100 having a server 120 connected to one or more remote user devices 130 and to internal and external databases and service 110. Server 120 includes a processor 121 that executes computer readable medium and instructions stored on the server (or elsewhere) to perform critical functions of the BAMS system. A user operating device 130 may have a subscription to a service and may access service resources by signing on via subscriber credentials such as stored at subscriber DB 123. Infringement Detection Engine ("IDE") 124 accesses information, collectively referred to at 110 as internal and external database(s) 112 and 114. Service DB and interface 126 is adapted to automatically collect and process internal and external sources of information (112, 114) relevant in collecting brand monitoring information to be used to detect infringements and to generate related graphs. Server 120 is in electrical communication with BAMS databases 110, e.g., over one or more or a combination of Internet, Ethernet, fiber optic or other suitable communication means. Server 120 includes a processor 121 and a memory 122, in which is stored executable code and data, including a subscriber (e.g., MarkMonitor) database 123. A training/learning module 127 and a Graph module 128. Processor 121 includes one or more local or distributed processors, controllers, or virtual machines. Memory 122, which takes the exemplary form of one or more electronic, magnetic, or optical data-storage devices, stores non-transitory machine readable and/or executable instruction sets for wholly or partly defining software and related user interfaces for execution of the processor 121 of the various data and modules 123-128.

Quantitative analysis, techniques or mathematics and models associated with modules 124 to 128 in conjunction with computer science are processed by processor 121 of server 120 thereby rendering server 120 into a special purpose computing machine use to transform brand abuser lists, similarity scores, and other information into aggregated lists and similarity scoring and to deliver services for use by business analysts. This may include generating a set of search requests with entity identifiers for sending to services for generating lists of identified potential infringements and abusers and similarity scores to be received and aggregated by the IDE system.

The IDE 124 of BAMS 100 of FIG. 1 may be adapted to permit the receipt of a query including an entity or entities of interest such as from a user via a user portal as delivered in part via GUI 127. The IDE 124 further comprises an entity identification module for identifying entities and associating with them with entity identifiers for use with services.

The server 120 may include a digital communications interface ("DCI") that facilitates processing of search queries for issuing search requests to services, including necessary entity identifiers, and receiving service responses, including peer lists and scoring data, and handling follow up search requests such as after receiving feedback from users via the user interface that may indicate positives or negatives related to the initial peer lists of the services. Necessary handshake processing is handled by the DCI.

In one exemplary implementation, the BAMS 100 may be operated by a traditional professional services company, e.g., Thomson Reuters, wherein BAMS database corpus or set 110 includes internal service or databases or sources of content 112 such as TR Feeds. In addition, BAMS database set 110 may be supplemented with external sources 114, freely available or subscription-based, as additional data considered by the IDE. News database or source 1141 may be a source for confirmed facts. Also, government/regulatory filings database or source 1142, USPTO 1143, as well as other sources 1144, provide data to the BAMS system for generating aggregated abuser lists and similarity scoring. BAMS may be used to enhance enforcement strategies and enable users to track and spot new challenges in a changing market.

The BAMS 100 may be implemented in a variety of deployments and architectures. IDE data can be delivered as a deployed solution at a customer or client site, e.g., within the context of an enterprise structure, via a web-based hosting solution(s) or central server, or through a dedicated service. FIG. 1 shows one embodiment of the BAMS as comprising an online client-server-based system adapted to integrate with either or both of a central service provider system or a client-operated processing system, e.g., one or more access or client devices 130. In this exemplary embodiment, BAMS 100 includes at least one web server that can automatically control one or more aspects of an application on a client access device, which may run an application augmented with an add-on framework that integrates into a graphical user interface or browser control to facilitate interfacing with one or more web-based applications.

Subscriber database 123 includes subscriber-related data for controlling, administering, and managing pay-as-you-go or subscription-based access of databases 110 or the BAMS service. In the exemplary embodiment, subscriber database 123 includes user data (or more generally user) as data structures 1231, including user identification data 1231A, user subscription data 1231B, and user preferences 1231C and may further include user stored data 1231E. In the exemplary embodiment, one or more aspects of the user data structure relate to user customization of various search and interface options. For example, user ID 1231A may include user login and screen name information associated with a user having a subscription to the services accessed and distributed via BAMS 100.

Access device 130, such as a client device, may take the form of a personal computer, workstation, personal digital assistant, mobile telephone, or any other device capable of providing an effective user interface with a server or database. Specifically, access device 130 includes a processor module 131 including one or more processors (or processing circuits), a memory 132, a display 133, a keyboard 134, and a graphical pointer or selector 134. Processor module 131 includes one or more processors, processing circuits, or controllers. Memory 132 stores code (machine-readable or executable instructions) for an operating system 136, a browser 137, peer display/graph software 138, and interactive interface tools (IIT) 1382. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of graphical user interfaces on display 133. Upon launching processing software an integrated information-retrieval graphical-user interface 139 is defined in memory 132 and rendered on display 133. Upon rendering, interface 139 presents data in association with one or more interactive control features such as user interface tools region 1393, toolbar 1391, and Peer Identification Engine interface 1392. The interface 1392 may incorporate, comprise, or consist of a variety of existing software solutions or GUIs.

In one embodiment of operating a system using the present invention, an add-on framework is installed and one or more tools or APIs on server 120 are loaded onto one or more client devices 130. In the exemplary embodiment, this entails a user directing a browser in a client access device, such as access device 130, to Internet-Protocol (IP) address for an online information-retrieval system, such as offerings from Thomson Reuters Financial, Thomson IP, Westlaw, MarkMonitor, and other systems, and then logging onto the system using a username and/or password. Successful login results in a web-based interface being output from server 120, stored in memory 132, and displayed by client access device 130. The interface includes an option for initiating download of information integration software with corresponding toolbar plug-ins for one or more applications. If the download option is initiated, download administration software ensures that the client access device is compatible with the information integration software and detects which document-processing applications on the access device are compatible with the information integration software. With user approval, the appropriate software is downloaded and installed on the client device. In one alternative, an intermediary "firm" network server, such as one operated by a services customer, may receive one or more of the framework, tools, APIs, and add-on software for loading onto one or more client devices 130 using internal processes.

Once installed in whatever fashion, a user may then be presented an online tools interface in context with a document-processing application. Add-on software for one or more applications may be simultaneously invoked. An add-on menu includes a listing of web services or application and/or locally hosted tools or services. A user selects via the tools interface, such as manually via a pointing device. Once selected the selected tool, or more precisely its associated instructions, is executed. In the exemplary embodiment, this entails communicating with corresponding instructions or web application on server 120, which in turn may provide dynamic scripting and control of the host word processing application using one or more APIs stored on the host application as part of the add-on framework.

With reference to FIG. 2, the above processes, and as discussed in more detail below, may be carried out in conjunction with the combination of hardware and software and communications networking illustrated in the form of exemplary Brand Abuse Monitoring System ("BAMS") system 200. In this example, BAMS system 200 provides a framework for searching, retrieving, analyzing, and comparing service returned brand abuse detection lists and scoring. BAMS 200 may be used in conjunction with a system offering of a professional services provider, e.g., MarkMonitor, a part of Thomson Reuters Corporation, and in this example includes a Central Network Server/Database Facility 201 comprising a Network Server 202, a plurality of service databases 203, e.g., Thomson Reuters IP&S, Thomson Reuters IP Solutions, Thomson & Thomson, Westlaw, USPTO database, and other publicly and privately available services. BAMS 200 includes an Infringement Detection Engine 204, which includes a Target Identification and Monitoring Engine 205 having as components: a target identification module 206 (which includes dimension aggregator and scoring and clustering module), a service/DB interface module 207 (which includes OBAD 405, EAE 408, ERD 410 and Image processing module), and a User Interface/Graphical Interface Module 208 (having input, graph, and portal modules). The Central Facility 201 may be accessed by remote users 209, such as via a network 226, e.g., Internet. Aspects of the BAMS 200 may be enabled using any combination of Internet or (World Wide) WEB-based, desktop-based, or application WEB-enabled components. The remote user system 209 in this example includes a GUI interface operated via a computer 210, such as a PC computer or the like, that may comprise a typical combination of hardware and software including, as shown in respect to computer 210, system memory 212, operating system 214, application programs 216, graphical user interface (GUI) 218, processor 220, and storage 222 which may contain electronic information 224 such as electronic documents. The methods and systems of the present invention, described in detail hereafter, may be employed in providing remote users access to searchable databases and tools for setting up and receiving reports concerning brand monitoring and abuse or infringement detection. Client side application software may be stored on machine-readable medium and comprising instructions executed, for example, by the processor 220 of computer 210, and presentation of web-based interface screens facilitate the interaction between user system 209 and central system 201. The operating system 214 should be suitable for use with the system 201 and browser functionality described herein, for example, Microsoft Windows operating systems commonly available and widely distributed. The system may require the remote user or client machines to be compatible with minimum threshold levels of processing capabilities, minimal memory levels and other parameters.

The configuration thus described in this example is one of many and is not limiting as to the invention. Central system 201 may include a network of servers, computers and databases, such as over a LAN, WLAN, Ethernet, token ring, FDDI ring or other communications network infrastructure. Any of several suitable communication links are available, such as one or a combination of wireless, LAN, WLAN, ISDN, X.25, DSL, and ATM type networks, for example. Software to perform functions associated with system 201 may include self-contained applications within a desktop or server or network environment and may utilize local databases, such as SQL 2005 or above or SQL Express, IBM DB2 or other suitable database, to store documents, collections, and data associated with processing such information. In the exemplary embodiments the various databases may be a relational database. In the case of relational databases, various tables of data are created and data is inserted into, and/or selected from, these tables using SQL, or some other database-query language known in the art. In the case of a database using tables and SQL, a database application such as, for example, MySQL™, SQLServer™, Oracle 8I™, 10G™, or some other suitable database application may be used to manage the data. These tables may be organized into an RDS or Object Relational Data Schema (ORDS), as is known in the art.

The BAMS 200 extracts and identifies entities relevant to brand protection from structured and unstructured data sources. The BAMS 200, directly or in combination with other services: 1) finds relations between those entities, 2) finds, identifies and links online and physical entities in order to expose and collect evidence from criminal/infringing networks responsible of the abuse our clients are subject to, 3) provides a search functionality ranked by a relevance metric adapted to brand protection, 4) provides smart group-by capability allowing bulk action in brand protection, 5) classifies entities by abuse category, 6) classifies entities by targeted brand, 7) provides ways to measure the impact of criminal actors on our clients and compare this impact with other brands in the same industry, 8) provides scalable and highly available querying, appending, editing and deleting capabilities to client applications, 9) captures and analyzes the evolution of threats over time, and 10) provides a forecasting capability to predict future threats.

At a high level, one embodiment of the invention includes the following three key components: 1) a Common Data Layer as a construct knowledge base of relationships between bad actors, brand infringement, phishing, fraud and piracy; 2) a Cross Product Search and Discovery including capability of fuzzy text searching, and image matching to aid in exploration, construction of machine learning algorithms to create high volume relationships; and 3) Data Visualization and Data Correlation, e.g., having histogram, time series, forecasting to visually explore relationships, and follow linkages between entities to identify high value targets. Attributes that are utilized in establishing connections between entities and in classification include the following: names, physical addresses, phone numbers, email addresses of sellers, corporate registration records; registrars, ISP's, name servers, IP addresses of web sites; product names, quantities, pricing, discounts, product images, descriptions, packaging, shipping companies, consignee information, bills of lading; and external data sources such as Dun & Bradstreet, shipment consignment databases, criminal databases, social networks such as Facebook/LinkedIn/Twitter profiles, DMV records, and government real estate registration records.

In one manner of operation the invention provides a multi-layered solution to the problem of detecting and monitoring brand abuses comprising the following discrete layers: 1) data collection layer—crawls the web, harvests search engines, collects social media feeds, potential phish emails and landing pages, and any other data source relevant to brand protection; 2) entity resolution layer—using data fusion, machine learning and image matching techniques, identifies fields and patterns in the data and classify and categorize them using an ontology of entities relevant to brand protection; 3) graph layer—identifies relationships between entities into a directed property graph, wherein entities (vertices) and relations (edges) of the graph are multi-valued, e.g. may be represented by a set of key-value pairs, and efficiently loads and appends large amounts of data to the graph; 4) storage layer—stores and persists the graph in a distributed system scalable to an arbitrary large graph; 5) indexing layer—provides means to efficiently search on the graph and is supported by a distributed service able to scale to an arbitrary large graph; 6) server layer—provides a restful API for client applications to query and edit the graph; 7) search client layer—provides a fast browser based entity search capability for client applications; 8) visualization layer—provides a browser compatible graph interactive visualization capability for client applications; 9) correlation layer—augments the graph by correlating entities with external databases (Search engines, TR Clear, . . . ) both as a background task and on demand; 10) inference layer—uses graph theory and statistical techniques to score entities according to the probability of being associated with abuse, the magnitude of the impact the abuse have for our clients and the degree of centrality in the graph. These layers are discussed in more detail hereinbelow.

Data Collection Layer

The data collection layer uses a cluster on computers to crawl the web, harvest search engines, market places, collect social media feeds, potential phish emails and landing pages, mobile application data and any other data source relevant to brand protection. We define as detection the unit data point at the output of the data collection. A detection is a set of fields and values storing the information collected on a specific potentially infringing website, marketplace listing, social media post, paid search advertisement or piracy event. The fields can be, for example: Text such as product name; numbers such as price; images; other media such as video; raw data such as a HTML page source code. This dataset may be stored in relational database or a NoSQL database. The database is distributed in a cluster of computers.

Entity Resolution Layer

In one manner the entity resolution layer uses natural language processing, machine learning and image matching techniques to identify fields and patterns in the data and categorize them using an ontology of entities relevant to brand protection. The resolution method may be configured based on the kind of entity and the data source: structured data are identified as an entity by their field name, e.g., a phone number in a SQL table at row×column "Phone". The resolution layer parses entities from unstructured text using text pattern matching techniques. Efficient algorithms for fuzzy text pattern matching are Baeza-Yates-Gonnet for single strings and fuzzy Aho-Corasick for multiple string matching. Some entities represent a document class instead of a pattern included in the document. An example is the brand targeted by a phishing email. This kind of entity may be resolved using supervised or unsupervised document classification techniques after transforming the text documents into numeric vectors: using multiple string fuzzy text pattern matching algorithms such as fuzzy Aho-Corasick; and using topic models such as Latent Dirichlet Allocation (LDA) and Hierarchical Dirichlet Processes (HDP).

In another manner of operation, entities and relations between entities are processed from detection data with the following process. We categorize detection into a set of modules such as ecommerce websites, marketplace listings, social media posts, paid search ad, etc. For each module we categorize the fields into three kind of entities. First, "Key" entities uniquely define a detection. In most cases it corresponds to an identification code or number. Second, "Node" entities correspond to fields that have the potential to create relations between detections. In this manner the BAMS 200 is configured to identify an actor of the potential infringement (Registrant Name of the domain for a website), some infrastructure needed by the potential infringing system (name server) or an attribute of the infringing object (picture of a product). Third, "Property" entities correspond to fields that are not expected to create meaningful relations between detections, such as a price.

Graph Layer

The graph layer identifies relationships between entities into a directed property graph. Both entities (vertices) and relations (edges) of the graph are multi-valued, e. g. may be represented by a set of key-value pairs. This layer provides ways to efficiently load and append large amounts of data to the graph. A vertex is defined by the following set of properties: a unique identifying number; a label; the set of vertex identity numbers of the vertices this node has an outgoing edge too. Optionally a set of any other descriptors of the node. The graph may be represented in a map structure where the vertex ids are the keys and the list of other properties are the values. In order to be scalable to very large graphs the map structure may be distributed in a cluster of computers using a distributed hashing technique. Open source tools such as Apache Spark or Titan Database may be used to implement the distributed graph in a cluster of computers.

Loading the brand dataset into the graph database is performed in a cluster of computers. For each detection vertices are appended to the graph One vertex containing the value of the key node field is appended to the graph. For each node entity field if the graph does not already a vertex containing the same value a vertex with this value is appended to the graph. The property entity fields are appended as key/value pairs into the vertex create for the key entity of the current detection. Edges from the node vertices to the key vertices are appended to the graph.

Not all entities map directly to fields in the brand database. Extra entities are created. Some entities represent a document class instead of a pattern included in the document. An example is the brand targeted by a phishing email. This kind of entity may be resolved using supervised or unsupervised document classification techniques after transforming the text documents into numeric vectors. We use a cluster of computers to implement a text to vector transformation using Latent Dirichlet Allocation (LDA)—a generative "topic" model allowing sets of observations to be explained by unobserved groups that explain why some parts of the data are similar, e.g., where observations are words collected into documents, it posits that each document is a mixture of a small number of topics and that each word's creation is attributable to one of the document's topics. LDA may be implemented using Apache Spark LDA implementation.

Classifying the documents once they are transformed into numeric vectors is performed using the Random Forest (RF) algorithm. This can be implemented in the same Apache Spark cluster than for the text to vector transformation.

Some entities represent a set of similar images, such as several variations (cropping, scaling, rotation, blur and other transformations used by infringers) of the same product picture. All the images collected may be clustered using the following processes. First, a matching algorithm computes a distance metric between any two images. The distance is computed by taking the mean squared pairwise difference of features extracted from each image. Second, a hierarchical clustering algorithm clusters the images in the leaves of a trie (prefix tree). Each node is represented by the average of the feature vectors of all images in the children branches. A new image is matched to a cluster (leaf) by computing the distance of the new image to nodes starting by the root of the tree and going always towards the child with the smallest distance. The complexity of the algorithm is in $O(\log(n))$, n being the total number of images collected, which makes it scalable to very large (billions) set of images. In addition, using the trie structure, images may be represented by an efficient Locality Sensitive Hashing technique. We label each child of a node by a unique letter from a vocabulary of symbols (example: letters a-z, aa-az, ba-bz, . . . ). Each leaf of the tree is then represented by a unique string of symbols. This hash has the locality property: two hashes define a similarity measure between the source images.

Searching the Graph by Indexes

Indexes provide an efficient mean to search on the graph without having to traverse the whole graph. Querying the graph is performed in two steps: 1) use the indexes to efficiently retrieve the id of the vertex containing the entity; and 2) traverse the graph starting from this vertex using a breath-first traversal algorithm. Open source and commercial solutions may be used to build large indexes in a distributed cluster of computers.

If there is no path between two entities the distance is set to infinity. In an implementation infinity may be in this case coded as a large positive constant. Filters may be applied to retrieve only entities matching some requirements: return all entities y with a distance less than d from entity x such that property A of y is equal to a.

Augmenting the Graph

The graph may be augmented in several ways. In one manner of augmentation background tasks constantly correlate existing entities in the graph with external sources of information. When an entity is found to be correlated with an external document the background task: resolve entities in the document and append to the graph new entities found in the document if they do not already exist in the graph. Edges between the document entities and the graph entity are appended to the graph.

In another manner to augment the graph a user may initiate an on-demand correlation between an entity and some external source. Additionally, a user may manually edit, append or delete entities and edges of the graph. Further, the invention supports several type of correlation mechanisms. For example, searching an entity in a search engine such as Google search or Bing. The results of the search may be refined by the requirement that the entity searched and a document are linked to the author using an item frequency inverse document frequency method. If the entity and the document share some extra property that has a high frequency in entities close to the searched entity but are infrequent in general we assume the entity and the document are strongly associated. An entity resolution process is performed for each document found to be correlated with the searched entity. In addition, correlation with external databases such as TR Clear, TR TCM, Shipping or Custom databases, Company registration records or any third party database relevant to brand protection.

A version control mechanism based on assigning time stamps and user id to every change in the graph (entities and edges) ensures the ability to: track changes by time and user; backtrack changes in case of errors.

A connected component algorithm is used to partition the graph into disjoint sub-graphs (connected components). Edges may be filtered prior to the partition in order to be able to define criminal networks at different levels of confidence. The algorithm is implemented in a cluster of computers.

Statistical Inference in the graph is performed to classify entities into brand abuse classes. The set of classes vary by type and origin. For example, an image in a social media post may have two classes: Infringing versus Legitimate. For an auction listing we may have Counterfeit versus Genuine. The method is as follow: a bipartite factor graph is derived from the brand protection graph and a sum product algorithm is used to estimate probabilities of classes for each entity.

Natural language processing and statistical inference may be used to classify entities by what brand they target. Entities may be ordered in a hierarchy based on the closeness to the unobserved chief actors of infringing/criminal organizations at the origin of the fraud affecting our clients. The seniority of an entity may be based on one or more of the following approaches. The centrality of an entity in the sub-graph covering entities related to a given criminal network. The seniority is inferred from the graph using a refinement of the page rank algorithm where the initial values of entities are set with the probability obtained with the method described above in relation to the version control mechanism. After this initialization the algorithm computes the eigenvalues of the incidence matrix in an iterative way in the same manner than in the page rank algorithm. In addition, the closeness to verifiable physical entities such as, for example, a company name obtained in third party databases, a shipment address of origin from a Custom database. Also, a High Value Target score is computed for entities based on the seniority and impact as on clients. The impact is measured by averaging a measure of volume (such as traffic) using the probabilities estimated above in connection with the connected component algorithm.

The graph is persisted in physical storage in a cluster of computers that provides a distributed and resilient storage. The graph may be copied in a detachable media for archival or transfer to another computer cluster. Discussed in more detail hereinbelow.

The search client layer provides a fast browser based entity search capability for client applications. The visualization layer provides a browser compatible graph interactive visualization capability for client applications. A restful API server layer provides a way for client applications to query and edit the graph. Discussed in more detail hereinbelow. Also, graphs may be implemented as a brand "Data As A Service" in the cloud. The restful API allows any application to interact with the graph without concern for the actual implementation details of the graph. Additional features of the invention include a capability for partner compliance services and data and analytics for market research for clients.

Figure 3:
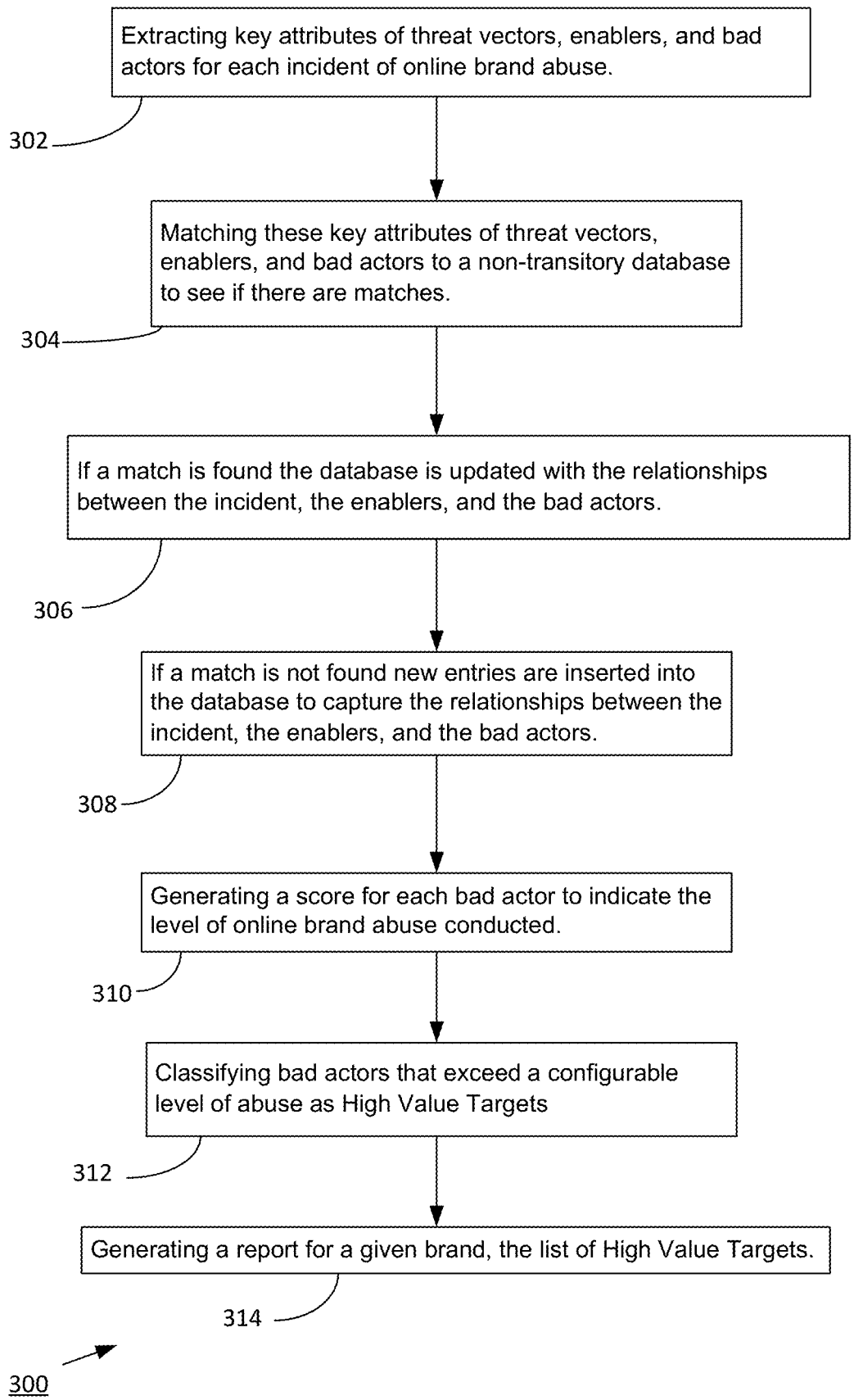
FIG. 3 is a flowchart illustrating an exemplary method implemented on a computer-based system for the present invention BAMS system.

FIG. 3 illustrates an exemplary logical flow of operation 300. At step 302, the IDE matches the key attributes of threat vectors, enablers, and bad actors to the abuse database to see if there are matches. At step 304, If a match is found the database is augmented with the relationships between the incident, the existing enablers, threat vectors, and bad actors. At step 306 if a match is not found new entries are inserted into the database to capture the relationships between the incident, the enablers, threat vectors, and bad actors. At step 308, a score is generated for bad actors based on the volume and breadth of incidents to indicate the level of online brand abuse they have conducted. At step 310, bad actors that exceed a configurable level of abuse are identified as "High Value Targets." At step 312, a report is generated listing the high value targets for a given brand.

Figure 4:
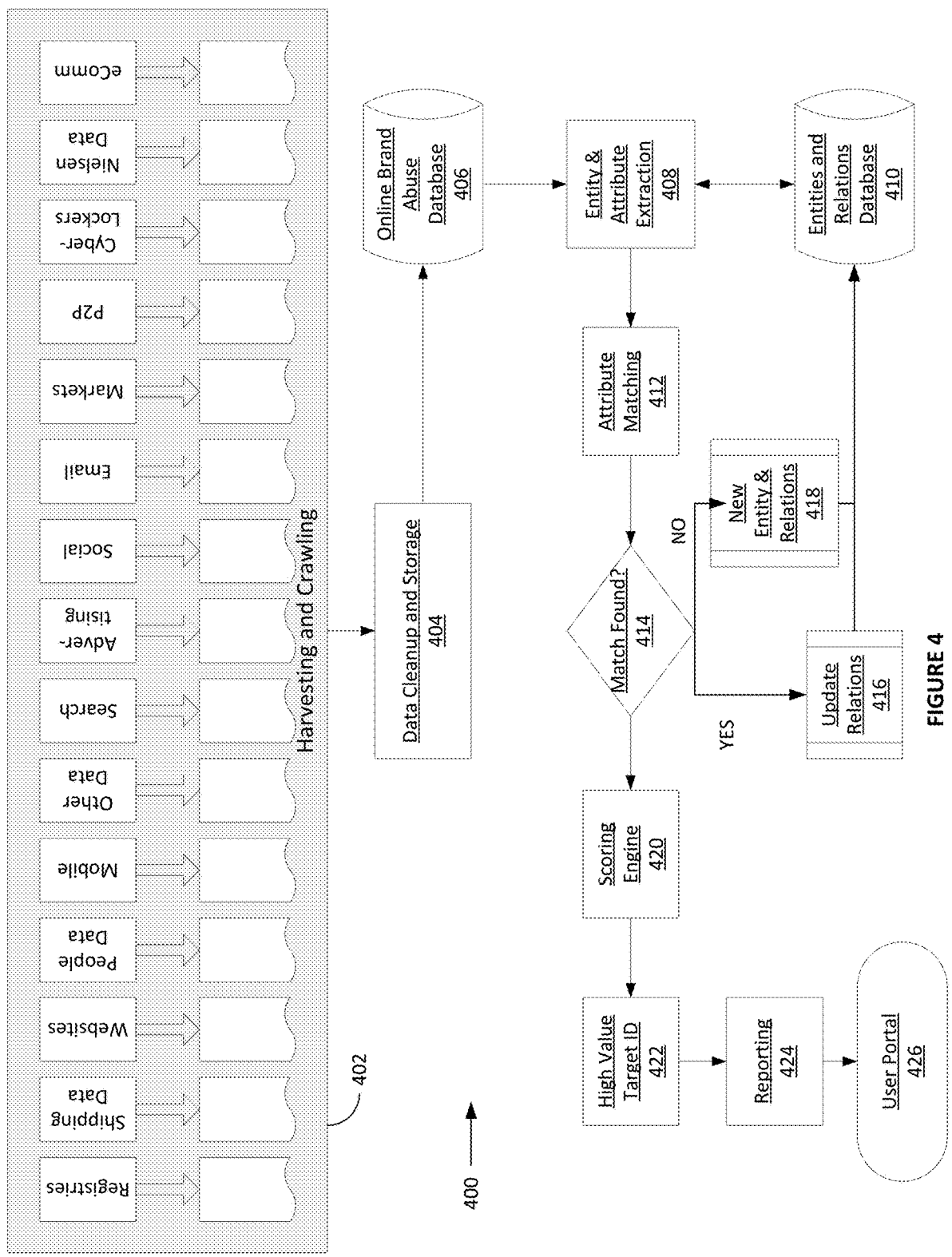
FIG. 4 is a further schematic illustrating an exemplary computer-based system for the present invention BAMS system.

FIG. 4 represents an exemplary system architecture for automated Identification of High Value Targets from Incidents of Online Brand Abuse. Computer implemented programs and tools may provide the following (herein after collectively referred to as incidents of 'online brand abuse'): 1. Automatically detect online infringements on another's copyrights and trademark rights; 2. Automatically detect online sales of counterfeit physical goods; 3. Automatically detect electronic mail message based 'phishing' fraud attacks; and 4. Automatically detect online piracy of electronic content such as music, video, e-books, photos. Persons and/or entities (herein after referred to as 'bad actors') that conduct online brand abuse do so on websites, online marketplaces, online auction sites, mobile application marketplaces, social media websites, and via electronic mail messages (herein after collectively referred to as 'threat vectors'). Bad actors are supported by online entities such as website registrars, website hosting providers, search engines; and entities in the physical world such as shipping and delivery companies, financial institutions such as banks, credit card companies, and others (herein after collectively referred to as 'enablers').

In one embodiment the invention provides a method and system that automatically identifies relationships between bad actors and incidents of online brand abuse across threat vectors by examining their key attributes. Bad actors who conduct large volumes of rand abuse are deemed 'High Value Targets'. The method and system operate by examining large volumes of incidents of online brand abuse. For each incident, key attributes of the associated threat vectors, enablers, and bad actors are extracted. These are compared to entries stored in a non-transitory database of online brand abuse. The abuse database includes instances of past online brand abuse and is constantly updated as new incidents are identified.

FIG. 4 illustrates components and an exemplary process flow used in an exemplary embodiment of BAMS 200. Data collection and brand abuse reporting system (DBAR) 400 includes an input section comprising one or more collection engine 402 adapted to harvest and crawl to obtain information available over Internet websites and potentially other sources of information. A data cleanup and storage module 404 receives data from collection input section 402 and after transforming and repackaging the information received stores the transformed data in online brand abuse database or storage (OBAD) 406. DBAR 400 further then analyzes the data collected for detecting brand abuse. Entity and Attribute Extraction module (EAE) accesses data for analysis from OBAD) 406 and may utilize techniques incorporated by reference hereinabove in the Background section as well as other techniques and upon identifying entities and detecting relations store the determined information in Entities and Relations Database (ERD) 410. EAE 408 provides sets of extracted attribute data to Attribute Matching module 412 and an associated logic block 414 determines the event of a match or non-match. If an extracted attribute data set is matched then a representative signal is generated and delivered to a routine 416 to handle updating relations information and stores same in ERD 410, e.g., updates an associated matched entity or relations record stored in the ERD. If an extracted attribute data set is not matched then a representative signal is generated and delivered to a routine 418 to handle generating a new entity and relations record for storing in ERD 410.

Data sets from the Attribute Matching module 412 are delivered to Scoring Engine 420 for further processing, including scoring in accordance with processes discussed in detail elsewhere herein. A High Value Target ID module 422 receives a scored set of attribute matching datasets post-scoring from scoring engine 420 for reporting by reporting module 424, which may include particular user-defined or selected reporting formats. In this instance the reporting data set is delivered to user portal 426 for presentation to a user such as by way of a connection of a client remote device via communications network such as the Internet.

Figure 5:
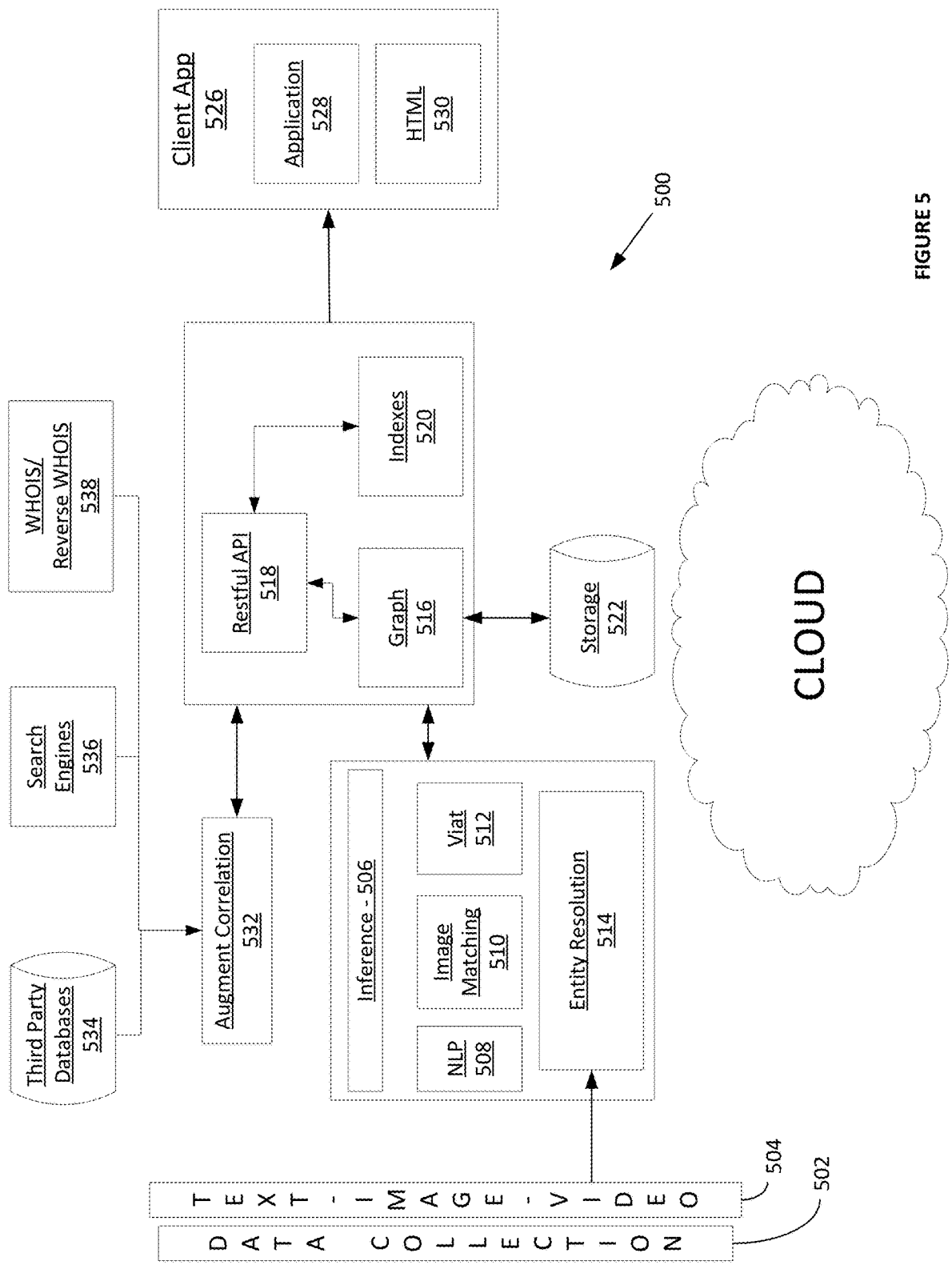
FIG. 5 is a further exemplary embodiment of a BAMS system.

FIG. 5 illustrates a further exemplary embodiment of the BAMS 200 system having a Data collection and brand abuse reporting system (DBAR) 500. Data from a variety of sources is received or obtained by a data collection engine 502. Here the data received for analyzing may include text data, image data, video data, audio data, etc. as represented by 504—essentially anything that carries a brand and is marketed and sold. For example, the goods may be books, ebooks, movie, broadcast or cablecast content or other video, songs, lyrics, imagery (such as photographs, brand logos (such as the Nike swoosh, Gucci logo, Lacoste alligator), shapes) The data collection engine 502 input section is adapted to harvest and crawl to obtain information available over Internet websites and potentially other sources of information. Data collection 502/504 is received into entity resolution module 514 for extraction of entity and relationship information. Image matching module 510 compares data marked as image against an internal or external database to match identified images against known goods or brand images to determine the possibility of infringement. Data related to known brand abusers/infringers may be used and to the extent new data related to infringement is identified the database and records or profiles related to known entities may be updated. A Natural Language Processor module 508 is used to identify text strings or other data from the collected data to determine potential brand abuse, e.g., unauthorized use of Nike, Gucci, Rolex, and other well known marks. The NLP 508 may be used to identify text strings known to be protected in some form, e.g., copyright, for potential notice and enforcement action. Inference module 506 is used in a manner consistent with the inference processes discussed elsewhere herein. A client application 526 includes application 528 and HTML generator 530 and is in communication with Restful Application Programming Interface (API) 518 to provide a means for interfacing with the DBAR 500. An Indexes section 520 and a graph module 516 serve as resources for the Restful API as well as the input analysis section and Agument Correlation module 532, which is connected to third-party databases 534, search engines 536, and WHOIS/Reverse WHOIS resources 538.

Figure 6:
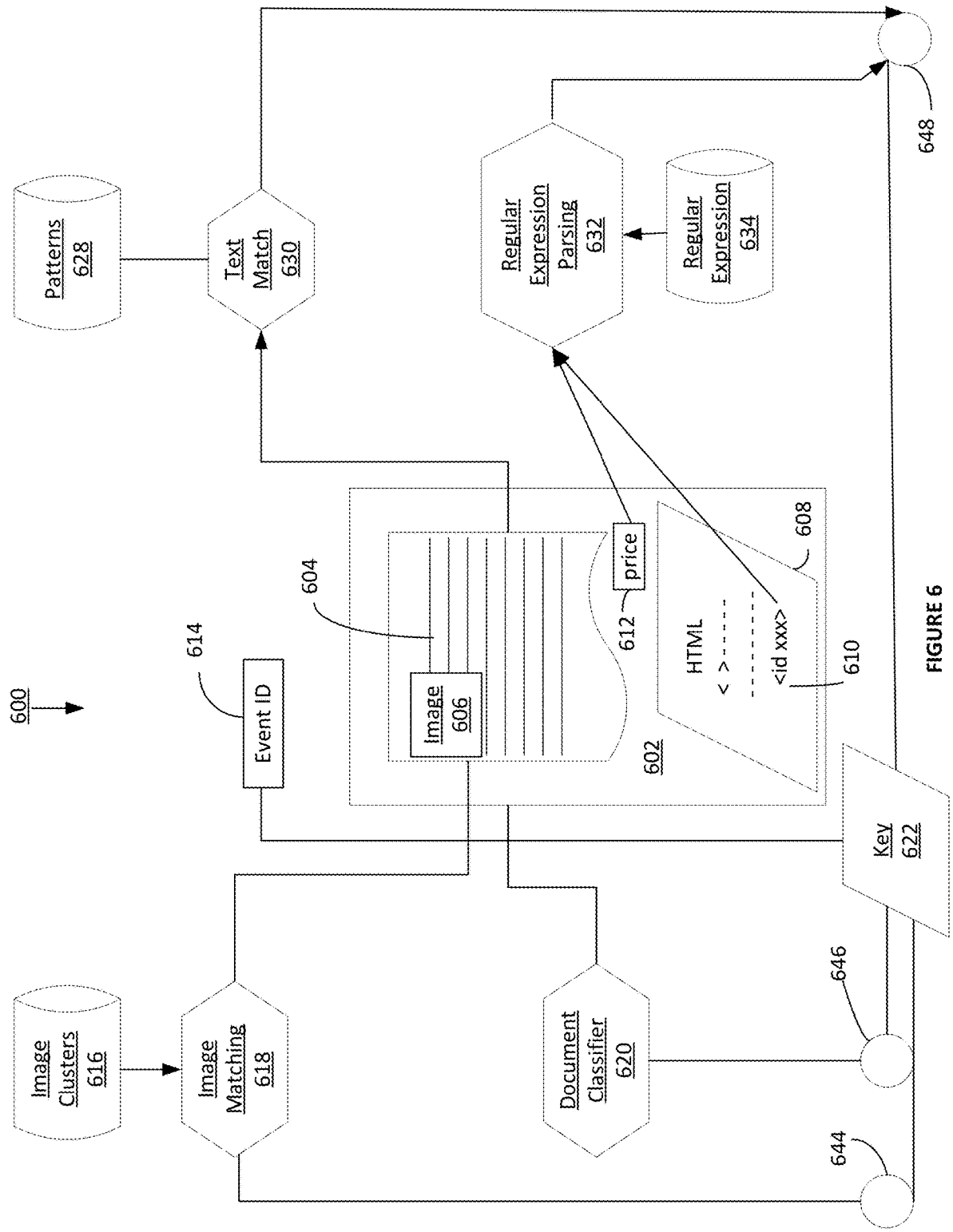
FIG. 6 is a schematic of a processing of an input document in accordance with the present invention BAMS system.

FIG. 6 illustrates a representative BAMS 600 adapted to receive and process a received document 602 having text content 604, image content 606, HTML content 608, and price content 612. The HTML content includes an HTML tagged identifier 610 that along with other attributes, such as price 612, are delivered to Regular Expression Parsing module 632 and may be stored into Regular Expression storage or database 634. Image data or file 606 is received by Image Matching module 618 which may compare the received image with images stored in and accessed from image clusters storage or DB 616. Text 604 from document 602 may be represented as a date file that is delivered to text match module 630, which may compare the text file, directly or after natural language processing and other steps are performed, with text strings or linguistic patterns stored in database or storage 628. Document classifier 620 processes document 602 and key 622 receives event ID data from element 614 and is connected via nodes 644, 646, and 648 to matching module 618, document classifier 620, regular expression parser 632 and text match module 630.

Figure 7:
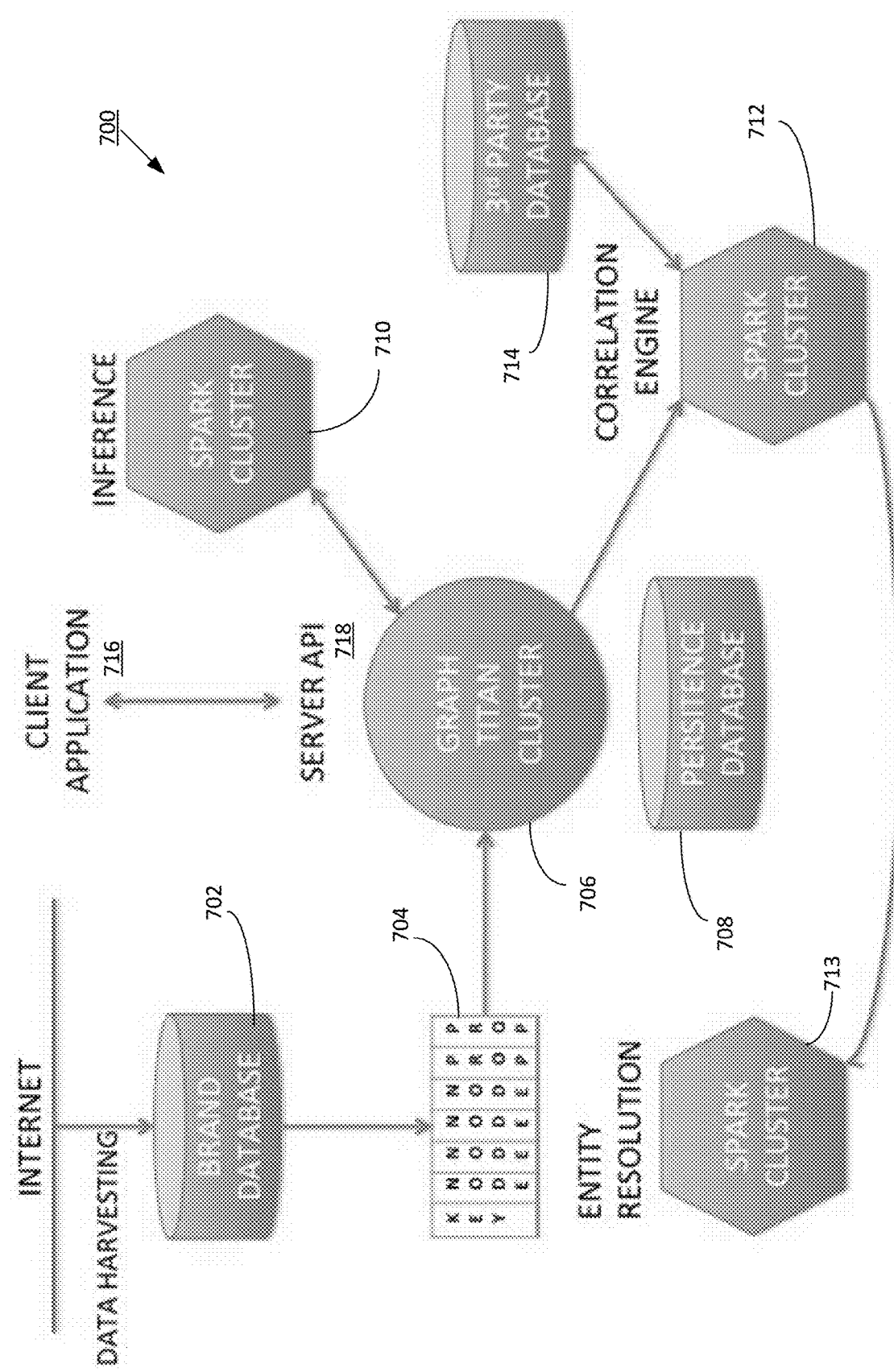
FIG. 7 is an exemplary schematic of the service layers in accordance with the present invention BAMS system.

FIG. 7 illustrates a further exemplary embodiment of BAMS 700 having a graph titan cluster engine 706 in electrical communication with a client application 716 via a server API 718, brand database 702 comprising brand related data harvested from Internet resources, inference Spark cluster 710, and correlation engine Spark cluster 712, which is connected to third-party database(s) 714 and entity resolution Spark cluster 713. Graph titan cluster 706 also has access to persistence database 708.

Table 1 below provides an exemplary process for use with the BAMS system embodiments described above.

TABLE 1

Table to Graph algorithm

Read table rows = $\{[c_{i0}, ..., c_{i,k-1}]\}$, i = 0 to N−1
Assign unique identifying number $ID_i$ to each row
  $rows^{ID} = \{[ID_i, [c_{i0}, ..., c_{i,k-1}]]\}$
Nest the ID numbers with each column
  $rows^{NESTED\ ID} = \{[(ID_i, c_{i0}), ..., (ID_i, c_{i,k-1})]\}$
Do a flat map of $rows^{ID}$ and swap ID and column
  EVENTID = $\{(c_k, ID_i)\}$
Do a flat map of rows and add a 1 to each row
  FEATURE1 = $\{(c_k, 1)\}$
Reduce by key
  FEATURERED = $\{(c_k$, number of occurrences $c_k$ in rows$)\}$
Filter out features with number of occurrences greater than MAXO
  FEATUREFILT = $\{(c_k)\}$
Assign unique identifying number $FID_i$ to each feature
  FEATUREID = $\{(c_k, FID_k)\}$
Join EVENTID and FEATURED on c
  JOINED = $\{(c_k, (ID_i, FID_k))\}$
Create one vertex in the graph for each feature in FEATUREID TABLE 1-continued Table to Graph algorithm For each row in JOINED append one edge from vertex $FID_k$ to vertex $ID_i$ Although often discussed herein in terms of corporate entities as the subject of the search and peer entities as the objects of the search returned to the user, the invention is not limited to companies and may be used to input as entities individuals, persons, places, animals, products, pharmaceuticals, investments, investors, industry groups, commodities, indexes, classified groups. Further, dimensions or attributes may include language(s), education, work history, positions held, age, organizational memberships, residence locations, client history, and other personal attributes associated with entities that may be useful in determining peers of the individual.

The present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

We claim:

1. A computer-based system connected via a communications network to a remote user device and a plurality of services, the system comprising a computer processor to perform data collection, wherein the computer processor is configured to perform:
  receiving a set of collection data from a set of services, the set of collection data comprising a set of brand abuse data for comparison against a control set of data stored in a non-transitory, user-updated abuse database and having a set of fields, and receiving, via the communications network, a query;
  identifying an entity, to identify and extract within the set of collection data a set of entity data, comparing the set of entity data against a set of entity control data to resolve entity identification, associating an entity identifier with an identified entity, and determining a set of relationship data between entities based on attributes of the entities;
  receiving data derived from the set of collection data including attribute data of the entities, comparing the received data against a set of known brand abuse data, generating a set of relationships between brand abuse incidents, bad actors who conduct the brand abuse incidents across threat vectors, and enablers of the bad actors, which include website registrars, search engines, shipping and delivery companies, or financial institutions, and generating an output indicating a presence of a match;

generating a set of score data based on volume and breadth of the brand abuse incidents; and presenting a graph representing the set of score data on a display device associated with the remote riser device, wherein the computer processor is further configured to classify entities by b rand abuse category, the computer processor is further configured to establish entity resolution, including natural language processing, machine learning and image matching to identify fields and patterns in collected data and categorize them using an ontology of entities for brand protection, the computer processor is further configured to class entities by brand abuse category by applying a Random Forest (RF) algorithm, and the computer processor is further configured to perform augmentation on the graph, to perform: 1) continuously and automatically correlating existing entities in the graph with external sources of information, wherein upon an entity determined to be correlated with an external document a background task: resolving entities in the document and appending to the graph new entities found in the document, and edges between the document entities and the graph entity are appended to the graph; 2) presenting a user with an interface to initiate an on-demand correlation between an entity and an external source; and 3) presenting a user with an interface to manually edit, append or delete entities and edges of the graph.

2. The system of claim 1, wherein the computer processor is further configured to rank for brand protection.

3. The system of claim 1, wherein the computer processor is further configured to provide bulk action based on brand protection criteria.

4. The system of claim 1, wherein the computer processor is further configured to transform text data extracted from a set of document data into numeric vectors.

5. The system of claim 1, wherein the computer processor is further configured to perform a text to vector transformation using one of a topic model or Latent Dirichlet Allocation (LDA).

6. The system of claim 1, wherein the computer processor is further configured to identify relationships between entities into a directed property graph, wherein entities corresponding to vertices and relations corresponding to edges of the graph are multi-valued.

7. The system of claim 1, wherein the computer processor is further configured to match attributes.

8. The system of claim 1, wherein the computer processor uses a cluster operating on a set of connected computers to obtain brand protection information by one or more of crawling web pages over the Internet, harvesting search engines, crawling online market places, collecting social media feeds, detecting potential phish emails and landing pages, and collecting mobile application data.

9. The system of claim 1, wherein the computer processor is further configured to collect detection data sets representing a unit data point or record comprising a set of fields and values and storing the detection data sets.

10. The system of claim 9, wherein the detection data sets comprise one or more of the following fields: text, including product name or brand; numbers, including price or brand or product identifiers; images, including logos or trademarks or photographs; video media; structured data, including an HTML page or source code.

11. The system of claim 9, wherein the computer processor is further configured to store the detection data sets in a relational database or a non structured query language (NoSQL) database distributed in a cluster of computers connected over a network.

12. The system of claim 1, wherein the entity resolution is based on a defined kind of entity and data source.

13. The system of claim 1, wherein the entity resolution parses entities from unstructured text using one or more of text pattern matching techniques, efficient algorithms for fuzzy text pattern matching, Baeza-Yates-Gonnet algorithm for single strings, and fuzzy Aho-Corasick algorithm for multiple string matching.

14. The system of claim 1, wherein the computer processor is further configured to use supervised or unsupervised document classification techniques after transforming collected text documents into numeric vectors using one or more of: multiple string fuzzy text pattern matching algorithms: fuzzy Aho-Corasick algorithm; topic models; Latent Dirichlet Allocation (LDA); and Hierarchical Dirichlet Processes (HDP).

15. The system of claim 1, wherein the computer processor is further configured to determine a set of relationship data between entities based on collected detection data sets by categorizing detection into one from the set consisting of: ecommerce websites; marketplace listings; social media posts; and paid search advertisements, and categorizing detection fields into one of kinds of entities consisting of: "Key" entities which uniquely define a detection; "Node" entities which correspond to fields that have a potential to create relations between detections; and "Property" entities which correspond to fields that are not expected to create meaningful relations between detections, including a price.

16. The system of claim 6, wherein the computer processor is further configured to form a vertex defined by a unique identifying number and a label, and wherein a set of vertex identity numbers of the vertices has an outgoing edge.

17. The system of claim 16, wherein the graph is represented in a map structure where the vertex identity numbers are keys and a list of other properties are the values.

18. The system of claim 17, wherein the map structure is distributed in a cluster of computers using a distributed hashing technique.

19. The system of claim 1, further comprising a cluster of computers connected over a network, the cluster adapted to load a brand dataset into a graph database and append a set of detection vertices to a graph vertex containing the value of a key node field appended to the graph.

20. The system of claim 19, wherein property entity fields are appended as key/value pairs into a vertex created for a key entity of a current detection and wherein edges from node vertices to key vertices are appended to the graph.

21. The system of claim 1, wherein collected data comprise images, and wherein the computer processor is further configured to perform image matching and clustering, to cluster images by determining a distance metric between a first image and a second image, the distance being determined by taking a mean squared pairwise difference of features extracted from each of the first image and the second image.

22. The system of claim 21, wherein the computer processor is further configured to perform hierarchical clustering, to cluster images in leaves of a prefix tree, wherein each node is represented by the average of a set of feature vectors of all images in children branches.

23. The system of claim 22, wherein a view collected image is matched to an existing image cluster by computing a distance of the new image to nodes starting by a root of the cluster and going toward the child with the smallest distance.

24. The system of claim 22, wherein, within the prefix tree, structure images are represented by an efficient Locality Sensitive Hashing technique, wherein each child of a node is labeled by a unique letter from a vocabulary of symbols and each leaf of the prefix tree is represented by a unique string of symbols.

25. The system of claim 1, wherein the computer processor is further configured to perform index search, to search on a graph without having to traverse the whole graph and wherein querying the graph is performed by: 1) using the indexes to efficiently retrieve a vertex identifier of a select vertex containing an entity of interest; and 2) traversing the graph starting from the select vertex using a breath-first traversal algorithm.

* * * * *